United States Patent [19]

Chandramouli et al.

[11] Patent Number: 5,043,412

[45] Date of Patent: Aug. 27, 1991

[54] AMBIENT TEMPERATURE CURING, HIGH CARBON CONTRIBUTING COMPOSITIONS

[75] Inventors: Pitchaiya Chandramouli, Louisville, Ky.; Raja Iyer, Naperville; Calvin Johnson, Lockport, both of Ill.

[73] Assignee: Borden, Inc., Columbus, Ohio

[21] Appl. No.: 403,048

[22] Filed: Sep. 1, 1989

Related U.S. Application Data

[63] Continuation of Ser. No. 210,726, Jun. 23, 1988, abandoned.

[51] Int. Cl.$^5$ ............................................. C08G 14/02
[52] U.S. Cl. ................................... 528/129; 528/142; 528/147; 528/155; 528/161; 528/162; 528/230; 528/239; 528/259; 525/480; 525/501; 525/503; 523/143; 523/145; 523/146
[58] Field of Search ............... 528/129, 142, 147, 155, 528/161, 162, 230, 239, 259; 525/480, 501, 503; 523/143, 145, 146

[56] References Cited

U.S. PATENT DOCUMENTS

| | | | |
|---|---|---|---|
| Re. 32,319 | 12/1986 | Korb et al. | 423/445 |
| Re. 32,720 | 7/1988 | Lemon et al. | 523/145 |
| 2,606,888 | 8/1952 | Williams et al. | 525/503 |
| 2,883,352 | 4/1959 | Sorge et al. | 523/168 |
| 2,985,614 | 5/1961 | Bright | 524/541 |
| 3,333,972 | 8/1967 | Elmer et al. | 106/58 |
| 3,410,718 | 11/1968 | Smith | 117/138.8 |
| 3,599,433 | 8/1971 | Murata et al. | 61/36 |
| 3,629,364 | 12/1971 | Soldatos | 525/414 |
| 3,639,658 | 2/1972 | Soldatos | 525/503 |
| 3,709,849 | 1/1973 | Lemon et al. | 523/144 |
| 3,879,338 | 4/1975 | Grazen et al. | 523/158 |
| 3,998,765 | 12/1976 | Novak et al. | 521/121 |
| 4,124,667 | 11/1978 | Coppola et al. | 264/29.5 |
| 4,148,777 | 4/1979 | LaBar et al. | 523/143 |
| 4,157,993 | 6/1979 | Funabiki et al. | 523/145 |
| 4,252,700 | 2/1981 | Funabiki et al. | 523/145 |
| 4,283,319 | 8/1981 | Konii et al. | 523/145 |
| 4,313,973 | 2/1982 | McMurtry et al. | 427/205 |
| 4,317,896 | 3/1982 | Holik | 525/501 |
| 4,336,179 | 6/1982 | Iyer | 523/145 |
| 4,407,972 | 10/1983 | Brezny | 501/99 |
| 4,419,477 | 12/1983 | Saeki et al. | 524/290 |
| 4,424,300 | 1/1984 | Udvardy et al. | 525/501 |
| 4,426,467 | 1/1984 | Quist et al. | 523/145 |
| 4,426,484 | 1/1984 | Saeki et al. | 524/541 |
| 4,430,441 | 2/1984 | Zhukovsky et al. | 501/109 |
| 4,459,376 | 7/1984 | Matsushima et al. | 523/145 |
| 4,460,717 | 7/1984 | Saeki et al. | 523/145 |
| 4,468,359 | 8/1984 | Lemon et al. | 264/82 |
| 4,468,486 | 8/1984 | Matsushima et al. | 523/146 |
| 4,474,904 | 10/1984 | Lemon et al. | 523/146 |
| 4,607,067 | 8/1986 | Ohashi et al. | 623/144 |
| 4,626,569 | 12/1986 | Waitkus et al. | 524/541 |
| 4,644,022 | 2/1987 | Iyer | 523/144 |
| 4,657,950 | 4/1987 | Iyer et al. | 523/145 |
| 4,703,022 | 10/1987 | Johnson | 501/95 |
| 4,775,455 | 10/1988 | Chandramouli et al. | 204/294 |

FOREIGN PATENT DOCUMENTS

| | | |
|---|---|---|
| 533414 | 11/1956 | Canada . |
| 1065065 | 9/1959 | Fed. Rep. of Germany . |
| 1171606 | 6/1964 | Fed. Rep. of Germany . |
| 53-75294 | 7/1978 | Japan . |
| 55-66947 | 5/1980 | Japan . |
| 55-92247 | 7/1980 | Japan . |
| 56-141938 | 11/1981 | Japan . |
| 57-118074 | 7/1982 | Japan . |
| 62-28041 | 2/1987 | Japan . |
| 62-28043 | 2/1987 | Japan . |
| 1094590 | 12/1987 | United Kingdom . |

OTHER PUBLICATIONS

Schwarzkopf et al., "Refractory Hard Metals".
British Patent Application No. 2 154 593 A, Sept. 11, 1985.
British Patent Application No. 2 159 163 A, Nov. 27, 1985.
British Patent Application No. 8 332 571, Dec. 7, 1983.
Japanese Laid-Open Patent Application No. 62-282743, 12/8/87 (translation only).
EPO Patent Application No. 0 202 004 A2, Nov. 20, 1986.
EPO Patent Application No. 0 270 377 A2, Jun. 8, 1988.
British Patent Application No. 2 050 400 A, Jan. 7, 1981.
British Patent Application No. 2 131 789 A, Jun. 27, 1984.
British Patent Application No. 2 140 017 A, Nov. 21, 1984.

*Primary Examiner*—John Kight, III
*Assistant Examiner*—Sam A. Acquah
*Attorney, Agent, or Firm*—Venable, Baetjer, Howard & Civiletti

[57] ABSTRACT

A raw batch composition for use in making a shaped article such as a foundry shape or refractory article is disclosed. The composition comprises a mixture of an aggregate material; a phenol formaldehyde novolak resin; a phenol formaldehyde resole resin; and an ester functional curing agent. A shaped article prepared from the composition and processes for making a refractory body or foundry article are also disclosed.

53 Claims, No Drawings

AMBIENT TEMPERATURE CURING, HIGH CARBON CONTRIBUTING COMPOSITIONS

This application is a continuation of application Ser. No. 210,726, filed June 23, 1988 now abandoned.

BACKGROUND OF THE INVENTION

This invention pertains to a new binder composition suitable for use in bonding a particulate material such as sand or other refractory or foundry material to make a shaped article.

It is known in the art to employ phenol-formaldehyde resole resins to bond granular refractory material, e.g., in a foundry molding composition. For example, U.S. Pat. No. 4,426,467 to Quist et al. discloses such a composition which is curable at room temperature using a lactone as curing agent. While such compositions are extremely desirable inasmuch as they are curable at ambient temperature, such resins may have unacceptable thermal properties, i.e., they may experience veining and tearing at high temperatures experienced when subjected to molten metal in the foundry. Such resins are also especially deficient for use in preparing refractory articles, which, in addition to being able to withstand extremely high temperatures (e.g., for use in furnaces), must optimally contribute carbon when sintered. The carbon contributes to the dimensional stability of the articles via refractory bonding (i.e., through durable carbon-carbon bonds and carbon-aggregate bonds) and also provides abrasion resistance.

To obviate these problems of thermal insufficiency and insufficient provision of residual carbon, phenolic novolak resins may be tried. However, these novolak resins are undesirable inasmuch as they require heat to cure, resulting in numerous problems, among the most significant of which are (1) the evolution of noxious formaldehyde fumes which result from heating phenol formaldehyde resins, and (2) practically no "green strength", or room temperature cure.

It is also known to use a phenol-formaldehyde novolak resin to bond a carbonaceous aggregate, such as is disclosed in Chandramouli et al., U.S. Ser. No. 848,468, filed Apr. 7, 1986 now U.S. Pat. No. 4,775,455 (assigned to the assignee of the present invention). In a preferred teaching therein, a blend of a novolak and a resole resin, both phenol-formaldehyde resins, may be employed, but require thermal curing, or high acid levels. A need exists for a binder able to provide adequate green strength by a room temperature cure, and which also provides high strength after heat treatment.

SUMMARY OF THE INVENTION

Accordingly, the present invention provides a binder for a foundry or refractory article which overcomes the defects of the prior art, cures at room temperature, and provides a high strength bonding of various aggregates, in relation to commercially available systems.

In one aspect of the invention, a raw batch composition for use in making a shaped article, e.g., a foundry mold or core or a refractory article, is provided. The composition comprises a mixture of (a) an aggregate material; (b) a curable resin binder in sufficient quantity to bond the aggregate into a desired shape; and (c) a curing agent in an amount sufficient to effect curing of the binder, the binder (b) comprising a blend of (i) a phenol formaldehyde novolak resin having a formaldehyde:phenol mole ratio in the range of about 0.5:1 to about 1:1, and (ii) a phenol formaldehyde resole resin solution having a formaldehyde:phenol ratio in the range of about 1:1 to about 3:1, wherein the novolak resin (i) and the resole resin (ii) are present in a weight ratio of between about 0.35:1 and about 5:1, based on novolak resin solids, and wherein the curing agent (c) is selected from the group consisting of lactones, organic carbonates, carboxylic acid esters, and mixtures thereof. The resin binder may be present in the raw batch composition at a level of about 0.45% to about 20%, based on the weight of the aggregate, and the curing agent may be present at a level of about 5% to about 80% based on the weight of the resole solution of the resin binder.

In another aspect, a shaped article is provided, the shaped article comprising an aggregate material bonded together by a resin binder, the binder comprising a cured phenol formaldehyde resin, wherein the resin prior to curing is a blend of (i) a phenol formaldehyde novolak component having a formaldehyde:phenol mole ratio on a solids basis in the range of about 0.5:1 to about 1:1; and (ii) a phenol formaldehyde resole component solution having a formaldehyde:phenol mole ratio in the range of about 1:1 to about 3:1, wherein the novolak component (i) and the resole component (ii) were present in a weight ratio of between about 0.35:1 and about 5:1, and wherein the resin binder is cured using a curing agent selected from the group consisting of lactones, organic carbonates, carboxylic acid esters, and mixtures thereof.

In a further aspect, the invention relates to a process for making a refractory body that can be sintered to form a carbonized article. The body is prepared from an aggregate material; a binder which is a blend or mixture of phenol formaldehyde novolak and phenol formaldehyde resole components as defined below; and a curing agent in an amount sufficient to provide ambient temperature strength to the body. The process comprises the steps of (a) mixing aggregate with the resins, and adding an ester-functional curing agent, to coat the aggregate until a free flowing binder-aggregate mixture is formed; (b) molding the free flowing binder aggregate mixture into a desired shape; and (c) heating to cure thermally the resin binder. For refractory applications, additional heat can be applied to carbonize the resin binder. It is envisioned that the exact amounts used can be varied outside the ranges indicated above, and the ranges are not provided as limitations.

In still another aspect, the invention relates to a process for making foundry molds and cores from the aforedescribed mixture of aggregate, resin binder, and curing agent. The process comprises (a) mixing the aggregate with, for example, about 0.35% to about 3.2% of the novolak resin, based on aggregate weight, and about 0.1% to about 2.6% of the resole resin, based on aggregate weight, wherein the total amount of resin binder is not less than about 0.45%, and an ester-functional curing agent, to coat the aggregate until a free flowing binder-aggregate mixture is formed; and (b) rapidly discharging the mixture so formed into a core-box or pattern mold.

DESCRIPTION OF THE PREFERRED EMBODIMENTS

The Raw Batch Composition

This invention is, in one aspect, a raw batch composition comprising an aggregate material, a resin binder, and a curing agent. The choices of the aggregate material, and of certain characteristics of the resin binder, are made according to the end product that is desired.

The aggregate material may be any material which may be bound with a resin binder, i.e., to form a shaped article such as a foundry mold or core, or a refractory article such as a refractory brick for furnace lining. The aggregate material may be in granular, powder, flake or fibrous form. Suitable aggregate materials for use in foundry applications include, but are not limited to, silica sand, quartz, chromite sand, zircon sand, olivine sand, and mixtures thereof. Suitable aggregate materials for use in refractory applications include, but are not limited to, magnesite, alumina, zirconia, silica, silicon carbide, silicon nitride, boron nitride, bauxite, chromite, corundum, and mixtures thereof.

It has now been found that, by employing a blend of a novolak component and a resole component, a resin binder may be formulated which is capable of providing adequate room temperature strength and superior high temperature strengths, not obtained with prior art ester cure systems. This binder provides, when thermally cured, the desirable properties not available with the prior art, of high carbonization and low thermal conductivity, resulting in the formation of carbon bonding for dimensional stability and abrasion resistance, and the ability to withstand extremely high temperatures, all of which make for a binder which is useful for refractory applications. Furthermore, such binders exhibit unique thermal properties for foundry use which help prevent metal casting defects, e.g., veining and hot tearing.

One of the constituents of the resin binder is a novolak component. By "component" resin is meant an individual resin and/or a blend, mixture, reaction product, or other combination of resins containing the novolak or resole of reference. A novolak resin is one prepared with a deficiency in aldehyde so that when used alone, it may not be cured unless a curing agent such as hexamethylenetetramine ("hexa") is added. A novolak resin may be defined as the generally acidic resinous reaction product of a phenol and an aldehyde that, for practical purposes, does not harden or convert to an insoluble, infusible condition upon heating but remains soluble and fusible. The formaldehyde:phenol mole ratio of the novolak useful in the present invention is in the range of about 0.5:1 to about 1:1, and preferably about 0.6:1 to about 0.8:1. Preferably, the novolak resin is prepared by condensing formaldehyde and phenol at a pH of less than about 4, and more preferably about 2.

The novolak component may be used in the form of, for example, a solution, flake, powder, or hot melt.

Novolak resins, due to their aldehyde deficiency, are not capable of curing unless a curing agent such as hexamethylenetetramine ("hexa") is used in the presence of heat. These resins do not provide adequate green strength to an article at ambient temperature. By "adequate green strength" herein is meant sufficient tensile strength to withstand without crumbling any necessary handling, movement, packaging, etc. of an article or shape prior to heat treatment. Hexa and/or other methylene-generators, such as, for example, formaldehyde or paraformaldehyde, can be added to the resin binders of the present invention. When used, hexa is added at a level of about 1% to about 20%, based on the weight of total phenolic novolak, and more preferably at about 5% to about 15%.

The second constituent of the resin binder of the present invention is an alkaline phenol formaldehyde resole component. The resole component is or contains the generally alkaline resinous reaction product of a phenol and an aldehyde which has been condensed (reacted) only to a stage where it still melts when heated and is still soluble in acetone. The resole resin has sufficient residual reactivity that it may be cured by heat to an insoluble and infusible condition, without the addition of a curing agent.

Preferred ester curable phenol formaldehyde resole resins are alkaline in nature, i.e., potassium or sodium alkali, or mixtures thereof. Suitable resins are disclosed in U.S. Pat. No. 4,474,904 to Lemon et al., herein incorporated by reference.

The resole resin useful in the present invention is one having a formaldehyde:phenol mole ratio in the range of about 1:1 to about 3:1, and preferably about 1.6:1 to about 2.4:1. The resole resin is generally prepared by reacting the desired proportions of monomers at a pH of greater than about 7.5, and more preferably about 7.5 to 12. It is also known in the art to prepare resole resins with bivalent metal catalysts at a pH of 4.5 to 5.5.

The amount of hexa, formaldehyde or other methylene-generator used will generally vary inversely with the amount of resole in the resin binder due to the additional methylol functionality. Hexa, if used, is preferably added to lower alkali level systems, since high alkalinity inhibits the effectiveness of hexa. However, use of hexa is optional.

A preferred ratio of novolak to resole is approximately 2:1 to 1:2. The resin binder of the present invention more preferably, but not necessarily, comprises an excess of novolak.

The weight average molecular weight of the resole can vary over a broad range such as from about 700 to about 5,000, and preferably in the range of about 800 to about 1,700. The weight average molecular weight ($M_w$) is measured using gel permeation chromatography and phenolic resin standards. The sample whose molecular weight is to be measured is prepared as follows. The resin sample is dissolved in tetrahydrofuran, and neutralized with 1N hydrochloric or sulfuric acid. The salt which results is removed by filtration, and the supernatant liquid run through a gel permeation chromatograph.

The phenol formaldehyde resin will customarily but not necessarily be an aqueous solution having a solids content of from about 40% to about 75% by weight. It is preferable to have a high solids content, but if the viscosity is too high, the material becomes difficult to handle and mixing characteristics and performance fall. If the solids level is too low, the viscosity is low and performance suffers due to insufficient binder level. The solids content is measured by heating a weighed sample (2.0±0.1 g) in an air circulating oven for 1.75 hours at 135° C.

The phenol formaldehyde resin binders of the present invention are alkaline. The preferred alkaline materials used to formulate the resins are potassium hydroxide, sodium hydroxide, calcium hydroxide, magnesium hydroxide, or mixtures of these, the more preferred being potassium hydroxide. The alkaline hydroxides are generally present in an amount sufficient to produce a molar ratio of equivalents of alkali to equivalents of phenolic moiety on the resole and novolak resin in the range of about 0.2:1 to about 1.2:1.

The resin binders of the present invention may be prepared simply by mixing the prescribed proportions of novolak and resole component. The preferred solvent is water but water-alcohol mixes also are acceptable. Glycols and glycol ethers can also be added as solvents, plasticizers or diluents.

Alternately, however, the binder may be prepared in situ by wholly or partially reacting the novolak resin in solution with additional formaldehyde at a pH in the range of about 7.5 to about 10.5, to form a resole resin.

The curing agent used in this invention is one known in the art having at least one ester-functional group which is capable of catalyzing the cure of the resole resin at ambient conditions. The ester-functional curing agent cures at ambient conditions the resole-novolak binders of the present invention to thereby provide ambient temperature cured green strengths previously unavailable to novolak-aggregate systems. Hexa, or other methylene-generating hardeners, may be added to the binders at various levels, preferably when the novolak to resole ratio is relatively high and the alkali level is relatively low.

The ester-functional curing agent may be selected from the group consisting of lactones, organic carbonates, carboxylic acid esters, and the like, and mixtures thereof. Generally, it is preferred to use a curing agent having from 3 to 12 carbon atoms and more preferably from 4 to 9 carbon atoms. Gaseous esters, such as $C_1$-$C_3$ alkyl formates, are also acceptable curing agents.

The use of a gaseous ester to cure resole resins is taught in U.S. Pat. No. 4,468,359, which is incorporated herein by reference.

Examples of lactones which accelerate the room temperature cure or hardening of the resin binders of the present invention include, but are not limited to, gamma-butyrolactone, valerolactone, caprolactone, beta-propiolactone, beta-butyrolactone, beta-isobutyrolactone, beta-isopentylactone, gamma-isopentylactone, delta-pentylactone, and epsilon-caprolactone.

Examples of organic carbonates which accelerate the cure of the resin binders of the present invention include, but are not limited to, propylene carbonate, ethylene glycol carbonate, glycerol carbonate, 1,2-butanediol carbonate, 1,3-butanediol carbonate, 1,2-pentanediol carbonate and 1,3-pentanediol carbonate. Other esters of short and medium chain (e.g., one carbon to ten carbon) alkylmonohydric or polyhydric alcohols, and short or medium chain carboxylic acids (e.g., carboxylic acids having one to ten carbon atoms) may be used.

Carboxylic acid esters which accelerate the cure of the resin binders include, but are not limited to, n-butyl acetate, ethylene glycol diacetate, glycerol diacetate (diacetin), and glycerol triacetate (triacetin). In the case where a carboxylic acid ester is used, triacetin is preferred.

Other aliphatic monoesters may be suitable, such as formates, propionates, butyrates or pentanoates, and the like. Additional aliphatic multiesters which may be suitable include diformate, diacetate, or higher diesters of ethylene glycol, diethylene glycol, propylene glycol, glycerol, 1,3-propanediol, 1,2-butanediol, 1,3-butanediol and 1,4-butanediol. Furthermore, diesters of dicarboxylic acids, such as dimethyl malonate, dimethyl glutarate, dimethyl adipate, and dimethyl succinate, are suitable.

Lower alkyl formates, gamma-butyrolactone, and propylene carbonate may be used, when rapid mixing, rapid shaping, and rapid curing are desired.

Esters of phenolics, such as phenylacetate, resorcinol monoacetate and resorcinol diacetate are also effective curing agents.

The curing agent preferably is present in an amount sufficient to effect curing of the resin binder typically at about 5% to about 80% by weight, based on the weight of resole resin in the binder, and preferably about 15% to about 25%. Curing conditions for the room temperature cure of the resin binder are preferably ambient temperature, i.e., at least about 20° C. (68° F.), and preferably at least about 25° C. (77° F.), for example, 68° F. to 95° F. The heat applied, which facilitates the further thermal cure or hardening of the resole-novolak binders after the room temperature curing, can be heat from an oven or heat from, for example, molten material poured into or onto a mold or article prepared from the binder and an aggregate. Alternatively, the ambient temperature cured shape can be installed in a ladle or furnace, further heated and/or fired, prior to exposure to molten metal. The heat also produces carbonization of the resin binder at temperatures above 600° C. Therefore, by "cure" herein is meant both the ester-functional curing agent acceleration of the cure or hardening of the resole-novolak binders, and also the subsequent heat and/or hexa-accelerated further cure or hardening of the resole-novolak binder.

The raw batch composition produced by combining the resin binder, aggregate, and curing agent may additionally comprise any of a number of optional modifiers or additives including non-reactive solvents, silanes, hexa, clays, iron oxide, or urea. In foundry applications, a preferred additive is a silane adhesion promoter, such as gamma-aminopropyl triethoxysilane, which is used in amounts of, for example, up to 0.05% to 0.5% by weight, based on the total resin binder. In refractory applications, clays, graphite, carbon pitch, and silicon dioxide are preferred additives.

The resin binder preferably has a viscosity in the range of about 50 cps to about 10,000 cps, as measured at 25° C. (77° F.) by Brookfield viscometer, model RVF. When the composition is to be used to make a foundry article, the resin binder viscosity is preferably in the range of about 50 cps to about 650 cps, and more preferably in the range of 100 cps to 300 cps (using a Brookfield spindle 1 or 2 at 20 rpm). When it is to be used to make a refractory article, the resin binder viscosity of the composition is preferably in the range of about 150 cps to about 10,000 cps.

The Shaped Article

The invention is, in a further aspect, a shaped article comprising an aforedescribed aggregate material bonded together with the aforedescribed resin binder and curing agents.

Accordingly, shaped articles which may be prepared include, for example, foundry shapes (e.g., foundry molds and cores), refractory articles (e.g., refractory bricks, kiln furniture, hot tops, tundish liners, insulation, and ceramic materials), and the like.

The shaped articles may optionally be prepared without a liquid ester and may be further treated with a gaseous ester curing agent, by gassing with a $C_1$-$C_3$ alkyl formate, pressing and sintering.

Process for Preparing a Shaped Article

In yet other aspects, the invention relates to a process for preparing a shaped article. In one aspect, the invention relates to a process for making a refractory body that can be pyrolyzed or sintered, and in another aspect, to a process for making foundry shapes such as molds and cores.

Mixing the aforedescribed aggregate material, resin binder and ester curing agent may be accomplished in any means known in the art, i.e., using any industrial mixer such as an Eirich mixer, a Simpson mixer, a Muller mixer, and the like.

The free flowing binder-aggregate mixture which results from the previous step may be molded by any technique known in the art and subjected to pressure to form a desired shape. For example, the binder-aggregate may be subjected to compression, or transfer, or isostatic pressing, or extrusion or injection molding at desired temperatures and pressures.

Following shaping, for refractory applications the shape may be subjected to a series of heat treatment techniques as known in the art. A typical heat treatment involves a continual increase in temperature up to about 350° F. (177° C.) to 400° F. (205 C) to effect thermal cure of the resin binder. Further heat treatment up to 800° C. to 1000° C promotes carbonization of the resin binder. The carbonization resulting from elevated temperature treatment of the resole-novolak binders of the present invention produces carbon yields of approximately 50–60% (at 800° C.) on a weight percent basis, compared to 40–50% carbon yield for a commercial resole resin (As9005) cured with a comparable ester level (17% triacetin, based on the weight of resole solution) and potassium/phenol mole ratio (0.32:1). The higher carbon yields for the heat treatment of the binders of the present invention are desirable in making foundry shapes and refractory articles, and the yields are comparable to those obtained from the hexa-accelerated cure of novolak resin, such as RL-2304 (57% carbon yield at 800° C.)

As in conventional foundry practice, the free flowing binder-aggregate mixture of the present invention is then discharged into a corebox or pattern mold by any method known in the art, such as is disclosed in U.S. Pat. No. 4,426,467 to Quist et al., herein incorporated by reference. For example, immediately after preparation, the binder-aggregate mixture may be discharged into a corebox or pattern mold and allowed to set at ambient temperature for a period of time dependent upon, among other things, the curing agent used. Gaseous ester-functional curing agents may also be introduced to the corebox or pattern mold at this time. Generally, the set time will be less than about 3 hours, but can be longer by suitable choice of the ester.

The resultant shaped article is then suitable for use in foundry molding and is resistant to veining and tearing often experienced by foundry articles.

The invention is illustrated by the following Examples which are intended merely for the purpose of illustration and are not to be regarded as limiting the scope of the invention or the manner in which it may be practiced. Unless specifically indicated otherwise, parts and percentages are given by weight.

EXAMPLE 1

A phenol formaldehyde novolak resin was made as follows. 66.44 parts by weight of phenol were added to a reactor fitted with a stirrer, condenser and thermometer. 0.24 parts of concentrated sulfuric acid and 0.24 parts of water were then mixed and added to the reactor. 33.07 parts of a 50% solution of formaldehyde were added slowly to the reactor under reflux. After all of the formaldehyde was added, the mixture was dehydrated at 200° F. (93° C.) under vacuum to yield 80 parts of novolak resin product. The novolak resin product was dehydrated until it had a water content of 8.5% (based on the Karl Fischer test).

25 parts of the resulting resin were mixed with 12.0 parts of a 45% solution of KOH at about 158° F. (70° C.) until a homogenous solution was formed. 8.0 parts of water were added to reduce the temperature to 104° F. (40° C.).

To this mixture were added 54.8 parts of ALpHA-SET 9005 phenol formaldehyde resole resin (from Borden Chemical, Columbus, Ohio, having a pH of 12.0, viscosity of 135 cps at 25° C., and specific gravity of 1.213 at 25° C. (77° F.)) and 0.2 parts by weight of A1100 gamma-aminopropyl triethoxysilane from Union Carbide, Tarrytown, N.Y.

To a Kitchen Aid mixer was added 2,500 gms of Wedron 730 washed and dried silica sand. The sand was brought to a temperature of 77° F. (25° C.). 37.5 gms of the above-described resin blend was added to the sand and mixed for a minute to make free-flowing resin coated sand.

To this mixture was added 9.4 grams of triacetin curing agent to initiate the room temperature cure. Standard American Foundrymen's Society one-inch dog bone tensile briquettes were made using a Dietert 696 core box from the resin-mixed sand. The test briquettes were cured at room temperature and broken at specific intervals. Tensile strength measurements were made used a Dietert Universal Sand Strength Machine 400-1; average tensile strength data are given in Table 1.

A portion of the resin coated sand was used to prepare 1⅛" (diameter) by 2" cylindrical cores. The collapsibility time was determined by placing the specimens in a Dietert 785 Thermolab Dilatometer at 1800° F and under 50 psig pressure. This test determined the amount of time required for the core to collapse under heat and pressure; longer time indicates higher thermal strength of the core. The result of this test is given in Table 1.

A portion of the resin was used to determine gel time. 40 grams of resin (at 25° C.), and 10 grams of triacetin were weighed into an 8 oz. wax coated paper cup. The cup was then placed in a constant temperature bath of 25° C. The contents were stirred continuously with a thermometer. A stop watch was started when the stirring began, and stopped when the batch no longer formed a string as the thermometer was pulled. The elapsed time denotes the gel time of the batch, and is recorded in Table 1.

EXAMPLE 2

A resole resin was prepared in situ from a portion of the novolak resin product described in Example I in the following manner. 2.5 parts of methanol were added under reflux to 81.7 parts by weight of the novolak resin product. 2.17 parts of a 25% solution of formaldehyde were added and allowed to react for several hours at 93°. C. (200° F.). 13.5 parts of methanol were added in several steps to yield an in situ-prepared resole resin mixture having a viscosity of 1850 cps at 77° F. (25° C.).

15.2 parts by weight of the phenol formaldehyde novolak resin product described in Example I were mixed with 8.0 parts of a 45% solution of KOH, 4.1 parts of water, 72.5 parts of ALpHASET 9005 resole resin. 0.2 parts of Union Carbide A1100 silane were mixed in the manner described in Example 1. The viscosity of the mixture was 625 cps at 25° C. Triacetin was added as in Example 1.

Three specimens were made from the resultant batch, and these specimens used to determine tensile strength; collapsibility time; and gel time, in the manner described in Example 1. Each of these parameters is shown in Table 1.

EXAMPLE 3

The procedure of Example 2 was repeated except that the amount of the novolak resin was increased to 18.2 parts, the amount of the ALpHASET 9005 resole decreased to 69.5 parts, and the in situ-prepared resole resin of Example 2 omitted. 0.2 parts of A1100 silane was again used. The resultant resin had a viscosity of approximately 1050 cps at 25° C.

Three specimens were again made, and these specimens used to determine tensile strength; collapsibility time; and gel time, in the manner described in Example 1. Each measurement is shown in Table 1.

EXAMPLE 4

25 parts by weight of the in situ-prepared resole of Example 2, 5.0 parts of a 45% solution of KOH, 69.8 parts of ALpHASET 9005 resole and 0.2 parts of A1100 silane were mixed. The resulting batch solution had a viscosity of approximately 1050 cps at 25° C. Triacetin was added as in Example 1.

Three specimens were made from the resultant batch, and these specimens used to determine tensile strength; collapsibility time; and gel time, in the manner described in Example 1. Each of these parameters is shown in Table 1.

EXAMPLE 5

A resole resin was prepared de novo as follows: 59.6 parts of a 50% solution of formaldehyde were added to a reactor fitted with a stirrer, condenser and thermometer. 39.6 parts of phenol and 0.8 parts of lime were then added. The batch was reacted at 158° F. (70° C.) for several hours and then dehydrated to a refractive index of 1.570-1.574 (at 25° C).

5.88 parts by weight of the above resole, 52.94 parts of the novolak described in Example 1, 29.41 parts of a 45% KOH solution, and 11.76 parts of water were mixed in the manner described in Example 1. The resin blend which resulted had a viscosity of 50,000 cps at 25° C. and, after triacetin was added as in Example 1, the blend had a gel time of 80 minutes.

EXAMPLE 6

45 parts of the novolak resin prepared in Example 1, 15 parts of the resole described in Example 5, 30 parts of a 45% KOH solution and 10 parts of water were mixed in the manner described in Example 1.

The resin blend which resulted had a viscosity of 38,000 cps at 25° C. Triacetin was added as in Example 1 and a gel time of 25 minutes and 43 seconds was observed.

EXAMPLE 7

66.6 parts of a mixed resin comprising a mixture of 75 parts by weight of the in situ-prepared resole of Example 2 and 25 parts by weight of the resole prepared in Example 5 were mixed with 33.4 parts of a 45% KOH solution as described in Example 1.

The resulting binder had a viscosity of 5600 cps at 25° C. and, after triacetin was added as in Example 1, the blend had a gel time of 35 minutes.

EXAMPLE 8

A phenolic novolak resin was prepared by taking 70.85 parts by weight of phenol in a reactor fitted with stirrer, condenser and thermometer. 0.33 parts each of concentrated sulfuric acid and of water were added to the reactor. 28.48 parts of a 50% solution of formaldehyde were slowly added to the reactor under reflux. When all of the formaldehyde was added, the resin was cooled to 50° C. (122° F.). 60 parts of a 50% solution of KOH were added and the contents mixed until an homogenous solution was formed. 40 parts more of 50% formaldehyde were then added and the contents reacted for about one hour at 90° C. (194° F.). 25 parts of water were then added and the reactor cooled to room temperature to yield a resin with a water content of 49% as determined by Karl Fischer reagent, and viscosity of 470 cps at 25° C. A batch was made by adding 0.4% by weight of A1100 silane, and triacetin was added as in Example 1.

Three specimens were made from the resultant batch, and these specimens used to determine tensile strength; collapsibility time; and gel time, in the manner described in Example 1. Each of these parameters is shown in Table 1.

COMPARATIVE EXAMPLE

A commercially available potassium alkali phenol-formaldehyde resole resin, ALpHASET 9005 from Borden Chemical, Columbus, Ohio, was cured at ambient conditions with triacetin, 17% by weight of resole, and the batch was subjected to each of the tests conducted in Example 1. The results are shown in Table 1.

TABLE 1

| | RESOLE-NOVOLAK BLEND/SAND COMPOSITIONS | | | | | |
|---|---|---|---|---|---|---|
| | | | Visc. at | Tensile Strength (psi) | | Collapsibility |
| Example No. | Gel time (min.) (sec.) | | 25° C. (cps) | 2 hrs. | 4 hrs. | 24 hrs. | Time (sec.) |
| 1 | 12' | 47" | 1590 | 26 | — | 80 | 234 |
| 2 | 11' | 20" | 625 | 40 | 61 | 133 | 168 |
| 3 | 12' | 35" | 1050 | 33 | 44 | 113 | 132 |
| 4 | 13' | 10" | 1050 | 28 | 44 | 53 | — |
| 8 | 4' | 47" | 470 | 72 | 100 | 113 | — |
| Comparative (commercial resole alone) | 9' | 30" | 135 | 58 | 80 | 146 | 81 |

EXAMPLES 9 THROUGH 16

The following procedure was followed in each of Examples 9-14 unless otherwise indicated.

An aggregate mixture was prepared as follows: 1500 grams of screened magnesia aggregate (i.e., one in which at least 95% of the aggregate passed through a 14 mesh sieve but was retained by a 50 mesh sieve screen) were mechanically mixed for three minutes with a 50% aqueous solution of a variety of resin blends as specified in Table 2 such that the composition in each instance comprised magnesia, specified resin and water, with resin binder comprising 3% of the composition by weight (excluding alkali). The alkali, potassium, was provided as the hydroxide and the potassium to phenol ratio represents the ratio of equivalents of potassium to equivalents of phenolic moiety on the combined resole-novolak resin binder. When used, hexamethylenetetramine was added at a level of 10% based on the weight of resin solids (excluding alkali). The resole resin utilized was ALpHASET 9005 minus trace amounts of surfactant and coupling agent. The novolak resin utilized was prepared by the oxalic acid catalyzed reaction of phenol and aqueous 50% formaldehyde, said novolak commercially available as BR-OX-31 from Borden, Inc., Columbus, Ohio.

The resin-coated magnesia aggregate was then pressed into tensile specimens using a dual platen press at 15 tons ram force.

Tensile strengths were measured at the following points of time:

$T_1$ = after 24 hours at ambient temperature (i.e., 73° F. (23° C.)±2)

$T_2$ = 40 hours after $T_1$, during which period the specimens were subjected to a heat cycle comprising 5 hours at 210° F., followed by 18 hours at 225° F., followed by 5 hours over which time the temperature was raised to 350° F., followed by 12 hours during which the temperature was held at 350° F.

$T_3$ = 10 hours after $T_2$, during which time the specimens were cooled to ambient temperature and subsequently heated 1 hour at 200° C. (392° F.) and tested while hot.

In each case, tensile strengths shown are the averages of two or three separate measurements.

From Examples 9 through 16 it can be seen that a conventional novolak solution containing hexa has unacceptable tensile strength after 24 hours at ambient conditions, whereas ester cured alkaline resole/novolak combinations have tensile strengths of at least 173 psi after treatment at ambient conditions for 24 hours. These tensile strengths are more than adequate for physical handling. In addition, the tensile strengths after thermal cure ($T_3$) are superior to strengths of conventional novolac resins (Example 9) and conventional resole resins (Example 10). A novolac-resole resin binder which is not room temperature ester cured will have acceptable high temperature performance, but will not have acceptable green strength (see Example 11). The Examples 9–16 also show acceptable tensile values after $T_2$ and $T_3$ heat history of the specimens.

Conclusion

There has thus been discovered a composition which is particularly suitable for making shaped foundry or refractory articles. Unlike prior art phenol formaldehyde novolak resin-containing compositions, the compositions of the present invention are capable of room temperature cure, and unlike prior art phenol formaldehyde resole resin-containing compositions, the compositions of the present invention contribute carbon to shaped articles prepared therefrom, provide dimensional stability, material strength, low thermal conductivity, and abrasion resistance. Unlike prior art phenol formaldehyde novolak resin-containing compositions, the compositions of the present invention can attain room temperature cure with sufficient strength to avoid crumbling or deformation of the shaped article before high temperature treatment.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the claims which follow.

What is claimed is:

1. A resin binder composition comprising:
   (a) a phenol formaldehyde novolak resin having a formaldehyde:phenol mole ratio in the range of about 0.5:1 to about 1:1;
   (b) a phenol formaldehyde resole resin having a formaldehyde:phenol ratio in the range of about 1:1 to about 3:1, said resole resin comprising an aqueous solution of an alkaline resole; and
   (c) an ester-functional curing agent in an amount sufficient to initiate room temperature cure of said resin binder:
   wherein said ester-functional curing agent (c) is selected from the group consisting of lactones, organic carbonates, carboxylic acid esters, and combinations thereof and is present in an amount in the range of about 5% to about 80% by weight, based on the weight of said resole solution,
   wherein said novolak resin (a) and said resole resin (b) are present in a said binder composition in a weight ratio of from about 0.35:1 to about 5:1,
   said resin binder, when cured with an ester-functional material, remaining thermally curable, and
   wherein the ratio of equivalents of alkali to equivalents of phenolic moieties in said binder is in the range of about 0.2:1 to about 1.2:1.

2. The resin binder composition of claim 1,

TABLE 2

| | COMPOSITION DESCRIPTION | | | TENSILE STRENGTHS | | |
|---|---|---|---|---|---|---|
| Ex. No. | Contents | Potassium: Phenol Ratio | % Triacetin | $T_1$ tensile strength (psi) | $T_2$ tensile strength (psi) | $T_3$ tensile strength (psi) |
| 9 | novolak resin in ethylene glycol + hexa (control) | 0 | 0 | 0 | 661 | 443 |
| 10 | resole (control) | 0.36 | 17 | 343 | 963 | 825 |
| 11 | 33% resole:66% novolak (control) | 0.21 | 0 | 0 | 800 | 800 |
| 12 | 66% resole:33% novolak + hexa | 0.42 | 11.4 | 292 | 1447 | 915 |
| 13 | 66% resole:33% novolak | 0.63 | 11.4 | 518 | 1008 | 694 |
| 14 | 33% resole:66% novolak | 0.21 | 5.6 | 173 | 1599 | 1415 |
| 15 | 33% resole:66% novolak + hexa | 0.21 | 5.6 | 182 | 1151 | 930 |
| 16 | 33% resole:66% novolak | 0.63 | 17 | 120 | 1405 | 1088 | wherein the weight ratio of novolak resin (a) to resole resin (b) is between about 2:1 and about 1:2, and further comprising ester-functional material equivalent to an amount of triacetin amounting to 17% by weight of said resin binder.

3. The resin binder composition of claim 2, wherein said resole resin portion of the resin binder composition is prepared in situ by wholly or partially reacting novolak resin with excess formaldehyde at a pH in the range of about 7.5 to about 10.5.

4. The resin binder composition of claim 1, further comprising a methylene-generator selected from the group consisting of formaldehyde, paraformaldehyde, and hexamethylene tetramine.

5. The resin binder composition of claim 1 wherein said curing agent (c) is selected from the group consisting of diacetin, triacetin, butyrolactone, monoesters of carboxylic acids, diesters of dicarboxylic acids, methyl formate, and combinations thereof, and wherein said curing agent is present in an amount from 10% to about 25% by weight based on the weight of said resole portion (b) of said binder composition.

6. The resin binder composition of claim 1, wherein said composition is in the form of a liquid mixture of said novolak, resole, and curing agent, and has a viscosity in the range from about 50 cps to about 10,000 cps, as measured by a Brookfield RVF Viscometer using a No. 1 spindle at 20 rpm and at 25° C.

7. The resin binder composition of claim 1, wherein said novolak resin (a) and said resole resin (b) are in aqueous solution and comprise in combination, from about 40% to about 75% by weight, based on solids weight of said solution.

8. The resin binder composition of claim 6, that is particularly adapted for use in foundry applications, wherein said resin binder composition has a viscosity in the range of about 50 cps to about 650 cps.

9. The resin binder composition of claim 6 that is particularly adapted for use in the manufacture of refractory articles, wherein said resin binder composition has a viscosity in the range of about 500 cps to about 5000 cps, said resin binder, when cured with an ester-functional material that is equivalent to an amount of triacetin amounting to 17% by weight of said resin binder, producing a yield of carbon upon carbonization of 50% to 60% on a weight percent basis.

10. A raw batch composition comprising a mixture of
(a) an aggregate material;
(b) an alkaline resin binder in sufficient quantity to bond the aggregate into a desired shape upon curing, the amount of said binder being from about 0.45% to about 20% based on the weight of said aggregate, said resin binder being ester-curable at room temperature and, after being ester-cured, also being thermally curable, and
(c) an ester-functional curing agent in an amount sufficient to initiate room temperature cure of said resin binder, said binder (b) comprising (i) a phenol formaldehyde novolak resin having a formaldehyde:phenol mole ratio in the range of about 0.5:1 to about 1:1, and (ii) a phenol formaldehyde resole resin having a formaldehyde:phenol ratio in the range of about 1:1 to about 3:1, wherein said resole resin comprises an aqueous solution of an alkaline resole, wherein said novolak resin and said resole resin are present in a said binder composition in a weight ratio of from about 0.35:1 to about 5:1, and wherein said ester-functional curing agent is selected from the group consisting of lactones, organic carbonates, carboxylic acid esters, and combinations thereof, and is present for curing purposes in an amount in the range from about 5% to about 80% by weight, based on the weight of said resole solution.

11. The raw batch composition of claim 10, wherein the resin binder is prepared by blending together said resole resin and said novolak resin, and wherein the weight ratio of novolak resin to resolve resin is between about 2:1 and about 1:1.

12. The raw batch composition of claim 10, wherein said resin binder is prepared in situ by wholly or partially reacting novolak resin with excess formaldehyde at a pH in the range of about 7.5 to about 10.5.

13. The raw batch composition of claim 10, wherein the ratio of equivalents of alkali to equivalents of phenolic moieties in said binder is in the range of about 0.2:1 to about 1.2:1.

14. The raw batch composition of claim 11, wherein said aggregate material is selected from the group consisting of silica sand, quartz, chromite sand, zircon sand, olivine sand, magnesite, zirconia, silicon carbide, silicon nitride, boron nitride, bauxite, chromite, corundum, alumina, silica, and mixtures thereof, and wherein the viscosity of said resin binder is in the range from about 50 cps to about 10,000 cps, as measured by a Brookfield RVF viscometer using a No. 1 spindle at 20 rpm and at 25° C.

15. The raw batch composition of claim 14, that is especially adapted for use in the foundry industry for making foundry molds and cores, wherein the viscosity of said resin binder is in the range from about 50 cps to about 650 cps.

16. The raw batch composition of claim 14, that is especially adapted for use in making refractory articles, wherein the viscosity of said resin binder is within the range of about 500 cps to about 5000 cps, said resin binder composition, upon heating to carbonize it, being capable of producing a yield of carbon of 50% to 60% on a weight percent basis, when cured with an ester-functional material equivalent to an amount of triacetin amounting to 17% by weight of said resin binder.

17. The raw batch composition of claim 10, wherein said composition further comprises an additive selected from the group consisting of graphite, carbon pitch, silicon dioxide, and clay.

18. The raw batch composition of claim 10, further comprising a methylene-generator selected from the group consisting of formaldehyde, paraformaldehyde, and hexamethylenetetramine.

19. The raw batch composition of claim 10, wherein said curing agent is selected from the group consisting of diacetin, triacetin, butyrolactone, mono-esters of carboxylic acids, diesters of dicarboxylic acids, methyl formate, and combinations thereof, and wherein said curing agent is present in an amount of from 10% to about 25% by weight based on the weight of the resole in said curable resin binder.

20. A process for making a refractory body that can be heated to form an article having a carbon bond, from:
an aggregate material,
a resin binder comprising a phenol formaldehyde novolak component and an aqueous alkaline phenol formaldehyde resolve component, and an ester-functional curing agent in an amount sufficient to effect room temperature curing of the resin binder,
said novolak component having a formaldehyde:phenol ratio in the range of about 0.5:1 to about 1:1,
the resole component having a formaldehyde:phenol ratio in the range of about 1:1 to about 3:1,
the weight ratio of said novolak component to said resole component being in the range of about 0.35:1 to about 5:1,
wherein said ester-functional curing agent is selected from the group consisting of lactones, organic carbonates, carboxylic acid esters, and combinations thereof, and
wherein said aggregate is selected from the group consisting of magnesite, alumina, silicon, zirconia, silicon carbide, silicon nitride, boron nitride, bauxite, chromite, corundum, and mixtures thereof,
said resin binder, upon heating to carbonize it, being capable of producing a yield of carbon of 50% to 60% on a weight percent basis, when cured with an ester-functional material equivalent to an amount of triacetin amounting to 17% by weight of said resin binder,
said process comprising the steps of:
(a) combining said aggregate with said binder and with an amount of an organic ester-functional curing agent that is effective to initiate room temperature cure of said resin binder,
(b) forming said mixture into a desired shape;
(c) permitting said resin binder to undergo room temperature cure so that said aggregate is bonder in said shape, and then
(d) heating said shape to effect thermal curing of said resin binder.

21. A process according to claim 20,
wherein said resin binder comprises a liquid blend of said novolak component and said resole component, and wherein about 5% to about 80% of a liquid, ester-functional curing agent based on the weight of the resole is incorporated with said resin binder blend mixture in step (a) of said process.

22. A process according to claim 20,
wherein said binder-aggregate mixture is formed into a shape, then said ester-functional curing agent is supplied to said shape in the form of a gas, vapor, or suspended droplets.

23. A process according to claim 20,
wherein said heating step (d) is at an elevated temperature and over a period of time sufficient to carbonize said resin binder to form a carbon bond for said aggregate.

24. A process according to claim 20,
wherein said resin binder is prepared by blending said resole resin and said novolak resin components, and said resins are applied to said aggregate in the form of said blend.

25. A process according to claim 20,
wherein said resin binder further comprises a methylene-generator selected from the group consisting of formaldehyde, paraformaldehyde, and hexamethylenetetramine.

26. A process according to claim 20,
wherein said resin binder is prepared in situ by wholly or partially reacting a phenol formaldehyde novolak resin with excess formaldehyde at a pH in the range of about 7.5 to about 10.5.

27. A process according to claim 24,
wherein the viscosity of said resin blend, prior to mixing with said aggregate, is in the range from about 500 cps to about 5,000 cps, as measured by a Brookfield RVF viscometer using a No. 1 spindle at 20 rpm and at 25° C.

28. A process for making foundry shapes such as molds and cores from
an aggregate material,
a resin binder comprising a phenol formaldehyde novolak component, an aqueous alkaline phenol formaldehyde resole resin component, and ester-functional curing agent, said novolak resin component having a formaldehyde:phenol ratio in the range of about 0.5:1 to about 1:1,
said alkaline resole component having a formaldehyde:phenol ratio in the range of about 1:1 to about 3:1, and
the weight ratio of said novolak component to said resole component being in the range of about 0.35:1 to about 5:1, and
wherein said ester-functional curing agent is selected from the group consisting of lactones, organic carbonates, carboxylic acid esters, and combinations thereof, and
wherein said aggregate is selected from the group consisting of silica sand, quartz, chromite sand, zircon sand, olivine sand, and mixtures thereof,
said process comprising the steps of:
(a) combining said aggregate with said resin binder, wherein the total amount of said resin binder is not less than about 0.45% by weight of said aggregate, to form a binder-aggregate mixture, then
(b) discharging said binder-aggregate mixture into a core box or pattern mold, whereby the resin binder cures at room temperature, thereby binding the aggregate material to make a foundry core or mold having an ester-cured resin binder that remains thermally curable.

29. A process according to claim 28,
wherein said binder comprises about 5% to about 80% of a liquid ester-functional curing agent, based on the weight of the resole in the said resin binder.

30. A process according to claim 28,
wherein said ester-functional curing agent is supplied in the form of a vapor, gas, or as gas-borne droplets, to the foundry core or mold prepared in step (b).

31. A process according to claim 28, further comprising the step of applying sufficient heat to said resin-bonded foundry core or mold thermally further to cure said resin binder.

32. A process according to claim 28,
wherein said resin binder is prepared by blending said resole and said novolak components, and said resin binder is applied to said aggregate in the form of said blend.

33. A process according to claim 28,
wherein said resin binder is prepared in situ by wholly or partially reacting a phenol formaldehyde novolak resin with excess formaldehyde at a pH in the range of about 7.5 to about 10.5, and said binder is applied to said aggregate.

34. A process according to claim 32, wherein the viscosity of said blend, prior to curing, is in the range from about 50 cps to about 650 cps as measured by a Brookfield RVF viscometer using a No. 1 spindle at 20 rpm and at 25° C.

35. A process according to claim 34, wherein the viscosity of said blend, prior to curing, is in the range from about 100 cps to about 300 cps.

36. A process according to claim 30, further comprising the step of gassing said foundry mold or cure with at least one $C_1$–$C_3$ alkyl formate, to cure said resin binder.

37. A shaped resin-bonded article comprising an aggregate material that is bonded together by an ester-cured resin binder that remains thermally curable, said resin binder prior to being ester-cured comprising:
(i) a phenol formaldehyde novolak component having a formaldehyde:phenol mole ratio in the range of about 0.5:1 to about 1:1, and
(ii) an aqueous alkaline phenol formaldehyde resole resin component having a formaldehyde:phenol mole ratio in the range of about 1:1 to about 3:1,
wherein said novolac component and said resole component are present in a weight ratio of between 0.35:1 and about 5:1, and
wherein said resin binder has been cured at ambient temperature using an ester-functional curing agent selected from the group consisting of lactones, organic carbonates, carboxylic acid esters, $C_1$–$C_3$ alkyl formates, and combinations thereof, but remains thermally curable.

38. The shaped article of claim 37, for use as a foundry mold or core
wherein said aggregate material is selected from the group consisting of silica sand, quartz, chromite sand, zircon said, olivine sand, and mixtures thereof and
wherein the viscosity of said resin binder blend, prior to ester curing, is in the range of about 5 cps to about 650 cps as measured by a Brookfield RVF viscometer using a No. 1 spindle at 20 rpm and at 25° C.

39. The shaped article of claim 37, for use in making a refractory article,
wherein the aggregate material is selected from the group consisting of magnesite, alumina, silica, zirconia, silicon carbide, silicon nitride, boron nitride, bauxite, chromite, corundum, and mixtures thereof, and
wherein the viscosity of said resin binder blend, prior to ester curing, is within the range of about 500 cps to about 5000 cps as measured by a Brookfield RVF viscometer using a No. 1 spindle at 20 rpm and at 25° C.

40. The shaped article of claim 39, wherein said resin binder produces carbon yield of from about 50% to about 60% upon heating at 800° C., when cured with an ester-functional material equivalent to an amount of triacetin amounting to 17% by weight of said resin binder, and forms a carbon binder for said aggregate upon carbonization of said resin binder.

41. The shaped article of claim 37, wherein said curing agent is selected from the group consisting of triacetin, butyrolactone, methyl formate, and combinations thereof.

42. A shaped article comprising an aggregate material that is bonded together in a desired shape by an ester-cured resin binder that remains thermally curable, and that is prepared by combining:
(a) an aggregate material;
(b) an ester-curable alkaline resin binder in a sufficient quantity to bond said aggregate into a desired shape at room temperature upon being ester cured, and
(c) an ester-functional curing agent in an amount sufficient to effect ester curing of said resin binder,
said resin binder (b) prior to curing consisting essentially of a liquid blend of
(i) a phenol formaldehyde novolak component having a formaldehyde:phenol mole ratio in the range of about 0.5:1 to about 1:1; and
(ii) an alkaline phenol formaldehyde resole component having a formaldehyde:phenol mole ratio in the range of about 1:1 to about 3:1;
said liquid blend having a viscosity int he range from about 50 cps to about 10,000 cps, as measured by a Brookfield RVF viscometer using a No. 1 spindle at 20 rpm and at 25° C.,
wherein said novolac component (i) and said resolve component (ii) are present in a weight ratio of between about 1:1 and about 3:1, and wherein said curing agent (c) is selected from the group consisting of lactones, organic carbonates, carboxylic acid esters $C^1$–$C_3$ alkyl formates, and combinations thereof.

43. A shaped article according to claim 42, that is useful in the production of a carbon bonded body,
wherein said resin binder produces carbon yields of from about 50% to about 60% upon heating said article at 800° C. to effect carbonization of the binder, when cured with an ester-functional material equivalent to an amount of triacetrim amounting to 17% by weight of said resin binder.

44. A shaped article according to claim 43, that has been heated to a temperature sufficient to effect carbonization of at least a part of said resin binder to form a carbon bond for the aggregate.

45. A process for making a resin-bonded shaped article that can be heated to carbonize the resin to form an article having a carbon bond comprising;
(a) forming a mixture of:
an aggregate material,
a resin binder comprising a liquid blend of a phenol formaldehyde novolak component and an aqueous alkaline phenol formaldehyde resole component
said liquid blend having a viscosity in the range from about 50 cps to about 10,000 cps, as measured by a Brookfield RVF viscometer using a No. 1 spindle at 20 rpm and at 25° C. and
an ester-functional curing agent in an amount sufficient to initiate room temperature curing of said resin binder,
said novolak component having a formaldehyde:phenol ratio in the range of about 0.5:1 to about 1:1,
said resole component having a formaldehyde:phenol ratio in the range of about 1:1 to about 3:1,
the weight ratio of said novolak component to said resole component being in the range of about 0.35:1 to about 5:1, and wherein said curing agent is selected from the group of ester-functional curing agents consisting of lactones, organic carbonates, carboxylic acid esters, and combinations thereof, (b) forming said mixture into a desired shape, and (c) permitting said resin binder to undergo room temperature ester cure initiated by said ester-functional curing agent so that said aggregate is bonded in said shape by ester-cured resin that remains thermally curable.

46. The process of claim 45, wherein said aggregate is selected from the group consisting of magnesite, alumina, zirconia, silicon carbide, silicon nitride, boron nitride, silica, bauxite, chromite, corundum, and mixtures thereof, and, said resin binder upon heating to carbonize it, being capable of producing a yield of carbon of 50%–60% on a weight percent basis, when cured with an ester-functional material equivalent to an amount of triacetin amounting to 17% by weight of said resin binder.

47. The process of claim 46, wherein prior to mixing with said aggregate, the viscosity of said resin binder is within the range of about 500 cps to about 5000 cps as measured by a Brookfield RVF viscometer using a No. 1 spindle at 20 rpm and at 25° C.

48. The process of claim 47, comprising the further step of (d) heating said shape to a sufficiently high temperature to carbonize said binder to form a carbon bond for said aggregate.

49. A process according to claim 20, wherein said resin binder comprises between about 2,5% and about 15% by weight of said binder-aggregate mixture.

50. A process according to claim 28, wherein said foundry core or mold so produced, when brought in contact with molten metal, provides improved thermal properties.

51. A process of claim 28, wherein the foundry mold or core so produced has improved collapsibility properties.

52. A process of claim 20, wherein initially said aggregate and said binder are mixed together to form a binder-aggregate mixture, and wherein said ester-functional curing agent is subsequently incorporated therein.

53. A process of claim 20, wherein said resin binder comprises a mixture of said novolak component, said resole component, and said ester-functional curing agent, which mixture is combined with said aggregate.

* * * * *